US008655854B2

(12) United States Patent
Claman et al.

(10) Patent No.: US 8,655,854 B2
(45) Date of Patent: Feb. 18, 2014

(54) HIERARCHICAL MULTIMEDIA PROGRAM COMPOSITION

(75) Inventors: Timothy Claman, Andover, MA (US); Robert Gonsalves, Wellesley, MA (US); Albert W. Kovalick, Santa Clara, CA (US)

(73) Assignee: AVID Technology, Inc., Burlington, MA (US)

( * ) Notice: Subject to any disclaimer, the term of this patent is extended or adjusted under 35 U.S.C. 154(b) by 396 days.

(21) Appl. No.: 12/844,209

(22) Filed: Jul. 27, 2010

(65) Prior Publication Data

US 2012/0030182 A1 Feb. 2, 2012

(51) Int. Cl.
*G06F 17/30* (2006.01)

(52) U.S. Cl.
USPC ............................ 707/690; 707/803; 707/805

(58) Field of Classification Search
USPC .................. 707/690, 705, 803, 805; 715/738; 725/40, 41, 43, 59, 93, 116, 146
See application file for complete search history.

(56) References Cited

U.S. PATENT DOCUMENTS

| | | | | |
|---|---|---|---|---|
| 7,945,541 | B1 * | 5/2011 | Schendel et al. | 707/695 |
| 2002/0032697 | A1 * | 3/2002 | French et al. | 707/500.1 |
| 2009/0044128 | A1 * | 2/2009 | Baumgarten et al. | 715/738 |
| 2009/0063277 | A1 * | 3/2009 | Bernosky et al. | 705/14 |
| 2010/0119204 | A1 * | 5/2010 | Yamasaki | 386/52 |
| 2010/0161575 | A1 * | 6/2010 | Basso et al. | 707/705 |

OTHER PUBLICATIONS

Apple Computer, Inc., Final Cut Pro User's Manual, Chapter 15, "Managing Complex Projects", 1999, pp. 267-270.
Sorenson Media Inc., "Exploring the Squeeze Interface", Section on "Filters", Sorenson Squeeze 6 User Guide, 2001-2009, pp. 4-6.

* cited by examiner

*Primary Examiner* — Neveen Abel Jalil
*Assistant Examiner* — Jagdish Pandya
(74) *Attorney, Agent, or Firm* — Oliver Strimpel

(57) ABSTRACT

A computer-based method for media composition of a family of related time-based media programs. The method involves creating a master program with time-based elements of video and/or audio as well as time-based and non-time-based metadata, creating a derivative program that includes derivative elements, defining an inheritance relationship between the master program and the derivative program that specifies elements of the master program to be inherited by the derivative program, and causing the derivative program to inherit the specified elements from the master program in accordance with the inheritance relationship. User interfaces are provided for creating, editing, and viewing hierarchical trees of related programs.

17 Claims, 13 Drawing Sheets

HIERARCHICAL MULTIMEDIA PROGRAM COMPOSITION

BACKGROUND

Many modern projects to create multimedia content, such as video and audio, are developed with the aim of maximizing their use and commercial exploitation. Such maximization can occur across several dimensions, including geographical territory, audience type, the venue in which the content is consumed, the delivery platform, the means of distribution, and the media format. To achieve such audience penetration, a major theatrical composition may be distributed in over 80 release formats. For example, many movies and television programs are made into versions suitable for distribution in different countries, which generally involve creating different language versions for video (titles, subtitles) and audio (dialog). Targeted audience types include adults, and children in various age brackets, with corresponding versions having different selections of content. The location at which the content is consumed places content constraints on programs, such as suitability for various age groups in a public theater, or the avoidance of aviation accidents for in-flight movies. A host of technical requirements also spawn additional versions for delivery, including versions for different means of distribution, such as DVD and the Internet, versions for different viewing platforms, such as theatres, television, computers, and mobile devices, versions that must adhere to specific video and audio standards requirements such as NTSC and PAL, and versions for 2D or stereo 3D video viewing.

In generally practiced workflows, editors create a master program, which is then disseminated to others charged with creating the related versions required for delivery across the various dimensions referred to above. Such groups may further edit the program to customize the master, improve aspects of the master, or correct problems they identified during customization. Even though these changes are made in the context of creating a specific program version, they may apply to some or all of the other versions of the master that are being generated. Current workflows provide little or no support for enabling such changes to be passed on to other versions. Furthermore, even once the master has been forwarded to the other groups, additional changes may be made to the master, in which case some of the work already performed at the version level may be wasted, and the customization started again from scratch. In addition, after completion of a first set of deliverable programs derived from a master program, unanticipated new versions may be added to the requirements. Current editorial workflows provide little or no means of leveraging work that has already gone into producing the existing programs that may be applicable to the newly required deliverables. Instead, an editor is typically required to start fresh from the master to create the new deliverables.

In sum, current media editorial workflows for creating multi-version, multiple format compositions are woefully inefficient in creating the downstream versions based on one or more masters, permitting changes to the master(s) with subsequent changes in the downstream versions, and automating the creation of many versions.

SUMMARY

Embodiments of the invention provide systems, methods, and computer program products for creating and editing families of multimedia compositions.

In general, in one aspect, a computer-based system for multimedia composition involves creating a master program of time-based media including one or more master elements, creating a derivative program of time-based media including one or more derivative elements, defining an inheritance relationship between the master program and the derivative program, wherein the inheritance relationship specifies at least one element of the master program that is to be inherited by the derivative program, and causing the derivative program to inherit the specified at least one element from the master program in accordance with the inheritance relationship.

Some embodiments include one or more of the following features. The specified element of the master program includes a track of time-based media. The track of time-based media includes at least one of a video clip or an audio clip. The specified element of the master program includes at least one of time-based metadata, a graphic element, and a portion of a track of time-based media. The master program elements include tracks that are comprised of track elements, and the element specified by the inheritance program includes metadata pertaining to at least one of the master program, a master program track, and a track element. A track element may be a portion of a master program track specified by a time-range or offset. After creating the derivative program, altering in the master program one or more of the specified master elements, and propagating the altered one or more master elements to the derivative program to create a revised version of the derivative program in which the one or more elements previously inherited from the master program are replaced with the altered one or more master elements. The propagating step occurs automatically when the altering step is completed, or is triggered by a command from a user. The inheritance relationship specifies a location within the derivative program where the element to be inherited is to be placed. Specifying the location within the derivative program includes specifying one of the derivative program tracks, and at least one of a time range, a temporal location, and a time-offset within the specified derivative program track. Creating a second derivative program of time-based media including one or more elements, defining a second inheritance relationship between the first-mentioned derivative program and the second derivative program, wherein the second inheritance relationship specifies at least one element of the first-mentioned derivative program that is to be inherited by the second derivative program, and causing the second derivative program to inherit the specified element from the first-mentioned derivative program in accordance with the second inheritance relationship. The specified element of the first-mentioned derivative program is inherited from the master program in accordance with the first mentioned inheritance relationship, and, after creating the first-mentioned derivative program and the second derivative program, altering in the master program one or more of the specified master elements, propagating the altered one or more elements from the master program to the first-mentioned derivative program in accordance with the first-mentioned inheritance relationship to create a revised version of the first-mentioned derivative program in which the one or more elements previously inherited from the master program are replaced with the altered one or more master elements, and propagating the altered selected at least one track or element from the first-mentioned derivative to the second derivative program to create a revised version of the second derivative program in which the one or more elements previously inherited from the first-mentioned derivative program are replaced with the altered one or more master elements. Providing a user interface for a user of the multimedia composition system to view the derivative program. The user interface includes, for each element of the derivative program, an indication as to whether the element was inherited from the master program. The derivative program includes a media element that is not inherited from the master program, and a master program element specified by the first-mentioned inheritance relationship, which, when inherited by the derivative program, potentially conflicts with the non-inherited element, and the computer-based system alerts a user to the potential conflict. Providing a user interface for a user of the multimedia composition system to edit the one or more elements of the master program. The user interface also enables the user to view a selected derivative program of the master program while editing one of the master program and a second selected derivative of master program.

Some embodiments include one of more of the following features that involve causing a derivative to inherit content from more than one master, i.e., multi-master program creation and editing. Creating a second master program of time-based media that includes one or more elements, defining a second inheritance relationship between the second master program and the derivative program, wherein the second inheritance relationship specifies at least one element of the second master program that is to be inherited by the derivative program, and causing the derivative program to inherit the specified at least one element from the second master program in accordance with the second inheritance relationship. After creating the derivative program, altering one of the specified at least one elements of the first-mentioned master program and the specified at least one element of the second master program, and propagating the altered element from the first master program or from the second master program to the derivative program to generate a revised version of the derivative program in which the previously inherited element in the derivative corresponding to the altered element is replaced with the altered element in accordance with the first-mentioned inheritance relationship or the second inheritance relationship.

Under another aspect, a computer program product includes a computer-readable medium and computer program instructions stored on the computer readable medium, which, when executed by a computer, instruct the computer to perform a process for multimedia composition that involves creating a master program of time-based media including one or more master elements, creating a derivative program of time-based media including one or more derivative elements, defining an inheritance relationship between the master program and the derivative program, wherein the inheritance relationship specifies at least one element of the master program that is to be inherited by the derivative program, and causing the derivative program to inherit the specified at least one element from the master program in accordance with the inheritance relationship. Various embodiments include computer program products that include computer readable media and computer-readable instructions stored on the computer readable media, which, when executed by a computer, further instruct a computer to perform processes for multimedia composition having one or more of the features described above.

Under another aspect, a computer-implemented user interface for media composition includes a representation of a master program of time-based media, the master program including one or more master elements, wherein the representation includes: an indication of at least one of the master elements; a derivative creation tool for enabling a user to define a derivative program of time-based media, the derivative program including one or more derivative elements; an inheritance tool for defining an inheritance relationship between the master program and the derivative program, wherein the inheritance relationship specifies at least one element of the master program that is to be inherited by the derivative program; a representation of the derivative program, wherein the representation includes an indication of at least one of the derivative elements; and a representation of the inheritance relationship.

DETAILED DESCRIPTION

Multimedia authoring systems, methods, and computer program products are described that structure the media composing process so as to enable creative work to be leveraged as much as possible across all the various deliverable program versions that stem from a single master composition. The described techniques reduce the duplication of work and replace the ad-hoc authoring workflows associated with the creation of families of time-based media programs today with a transparent and customizable framework for assembling families of related programs.

As used herein, the term derivative refers to a version of a program derived from a master or derived from another derivative that is at a higher level in the inheritance hierarchy. In the following description, we refer to the two programs that are connected with an inheritance relationship as parent program and child program, with the child generally being the recipient of material from the parent. The parent program sometimes corresponds to what is commonly referred to as a "master program" or "master," but sometimes the parent is itself a derivative. A key advantage of the hierarchical authoring system occurs when the same edit applies to many different derivatives. The more media and other elements that derivatives inherit from a master, the more efficient is the creation of the downstream derivatives.

Although prior automation techniques have been applied to the problem of encoding a flattened master program into different formats that are required for various ways of consuming media, a workflow that makes use of the common elements between various programs at the compositional level is needed. Furthermore, the reuse and sharing of common elements needs to persist throughout the authoring process, in which many alterations to media are performed in an unpredictable fashion, often by different members of the production team. As used herein, the authoring process may include any aspect of program creation and editing, including those described below and those listed in Table 1.

The media composition system and methods described here enable efficient workflows that avoid as much duplication of work as possible during the creation of a family of deliverable programs from one or a small handful of master programs. This is achieved by creating a hierarchical structure of media programs which are related by a set of inheritance relationships. The hierarchical structure of media programs may be used to define the elements that constitute each program even in the absence of any specific media content underlying the program elements. In other words, the establishment of the program hierarchy tree or graph may be performed as a separate process from the connection of each of the defined programs to actual media content. This abstraction enables program tree structures to be stored and reused as templates, as described in more detail below.

Figure 1:
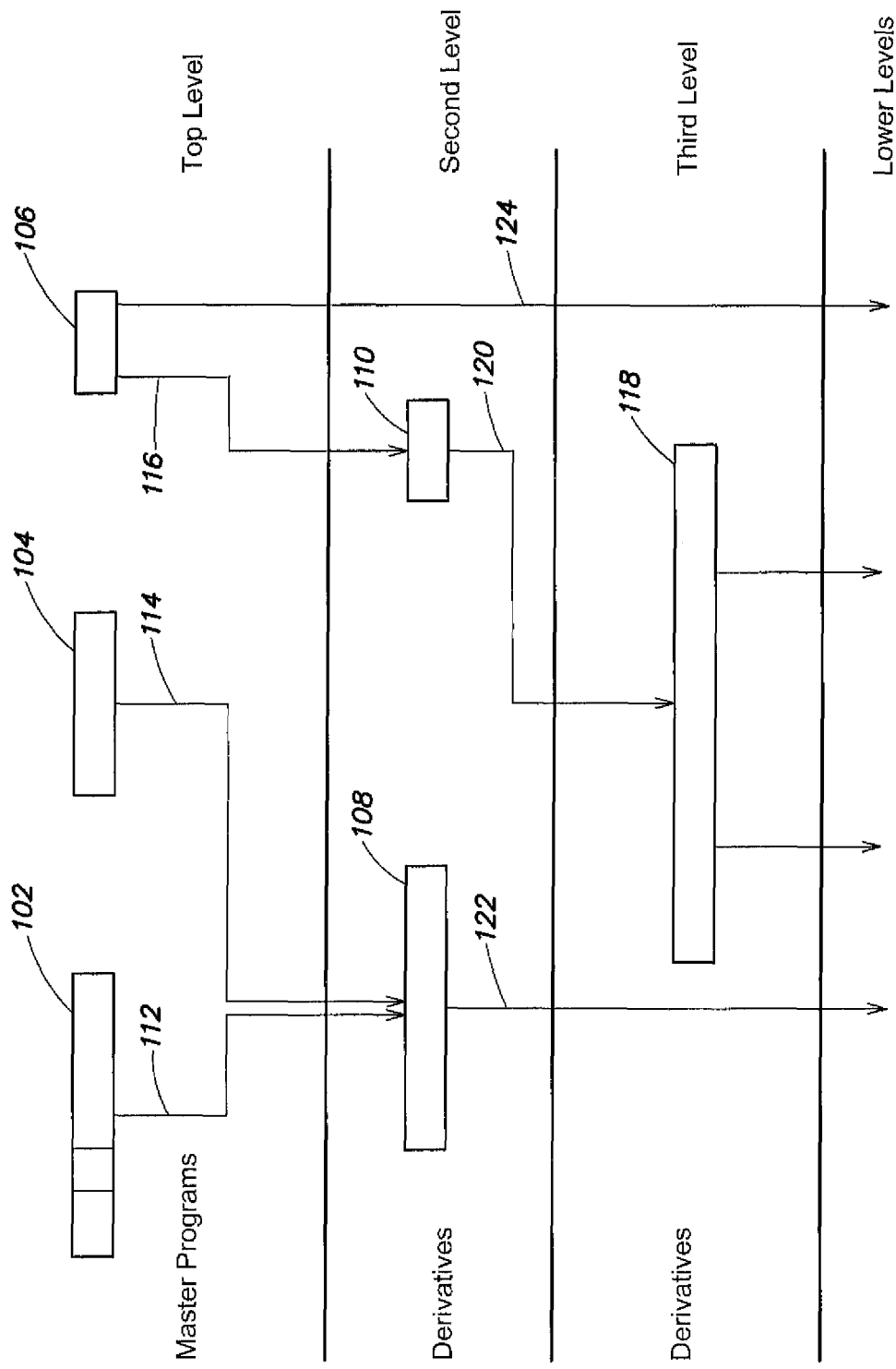
FIG. 1 is a diagram illustrating inheritance relationships between media programs in a family of related programs.

Referring to FIG. 1, the hierarchical structure starts at the top level, which includes one or more master programs (102, 104, 106). Each of the master programs may be represented by a timeline that includes one or more tracks, the tracks comprising elements, the elements including media (video, audio), as well as metadata, control elements, text, and other objects. A more detailed description of the elements of a master program is provided below. Derivative programs (108, 110) at the second level have inheritance relationships with the master programs, represented by inheritance connectors 112, 114, and 116. Further derivatives (e.g., 118) of the second level derivatives populate the next level of the tree, with inheritance relationships from programs (master or derivative) at one level to the next level down (e.g., inheritance connector 120), or skipping levels (e.g., inheritance connectors 122, 124). Note, the inheritance connector is a graphical representation of an inheritance relationship; other data structures may be used to represent inheritance relationships as part of a hierarchical family tree data structure.

As shown in FIG. 1, a derivative program at an intermediate level of the compositional hierarchy, may both inherit elements from a parent program, and also itself act as the parent for a derivative at a lower level. Derivatives at any level may include non-inherited elements as well as inherited elements. Furthermore, a program created as a master program may later be linked by an inheritance relationship to another master program, effectively making the former into a derivative program. Such a situation can arise after a master program is created when an editor identifies desired material in another master program and wishes to incorporate it.

In addition to specifying a parent and child, the specification of each inheritance relationship includes what is to be inherited, when propagation according to the inheritance relationship is to take place, and where in the child the inherited elements are to be placed. We discuss each of these aspects in turn below.

Anything that an editor may wish to reuse in a derivative work or in an endpoint deliverable work may be inherited. The inheritance relationship between a parent and child specifies what is to be inherited when the relationship is invoked, and information is propagated from the parent to a child. Elements that can be inherited include video tracks and clips, audio tracks and clips, portions of tracks, still images, graphics, as well as a wide range of metadata attributes and time-synchronous metadata streams, some of which are enumerated below.

A media composition includes time-based content, i.e., video, film and/or audio, that are typically represented by the media composition system as tracks in a graphical timeline view of a program. Each of the tracks includes one or more elements of the same type, which are sometimes referred to as clips. A clip, as used herein, refers to time-based audio or video media essence, but may also represent a graphical element or time related metadata information.

Time-based media that may be inherited include one or more entire tracks of video or audio that are present in the parent, in which case the child receives a clone of all the elements of the inherited track(s) from the parent. Tracks may also be inherited in part, in which case only a portion of a track is inherited, the portion being specified as a clip, a time range, or portions of a certain type or origin; any method that specifies a track portion may used to identify what is to be inherited. In the example illustrated in FIG. 2, parent program 202 includes tracks 204 and 206, each track including multiple elements. Track 208 of derivative program 210 is a clone of parent track 204. By contrast, track 212 of derivative program 214 includes a mix of inherited elements 216 and 218 that it received from elements 220 and 222 of parent track 204, as well as non-inherited elements 224 and 226. Such non-inherited elements may be new essence that is added to the derivative, or essence that was originally inherited from the parent, but subsequently modified in the derivative and no longer linked by inheritance to the parent. Derivative program 214 also includes track 228, which does not include any inherited material.

Figure 2:
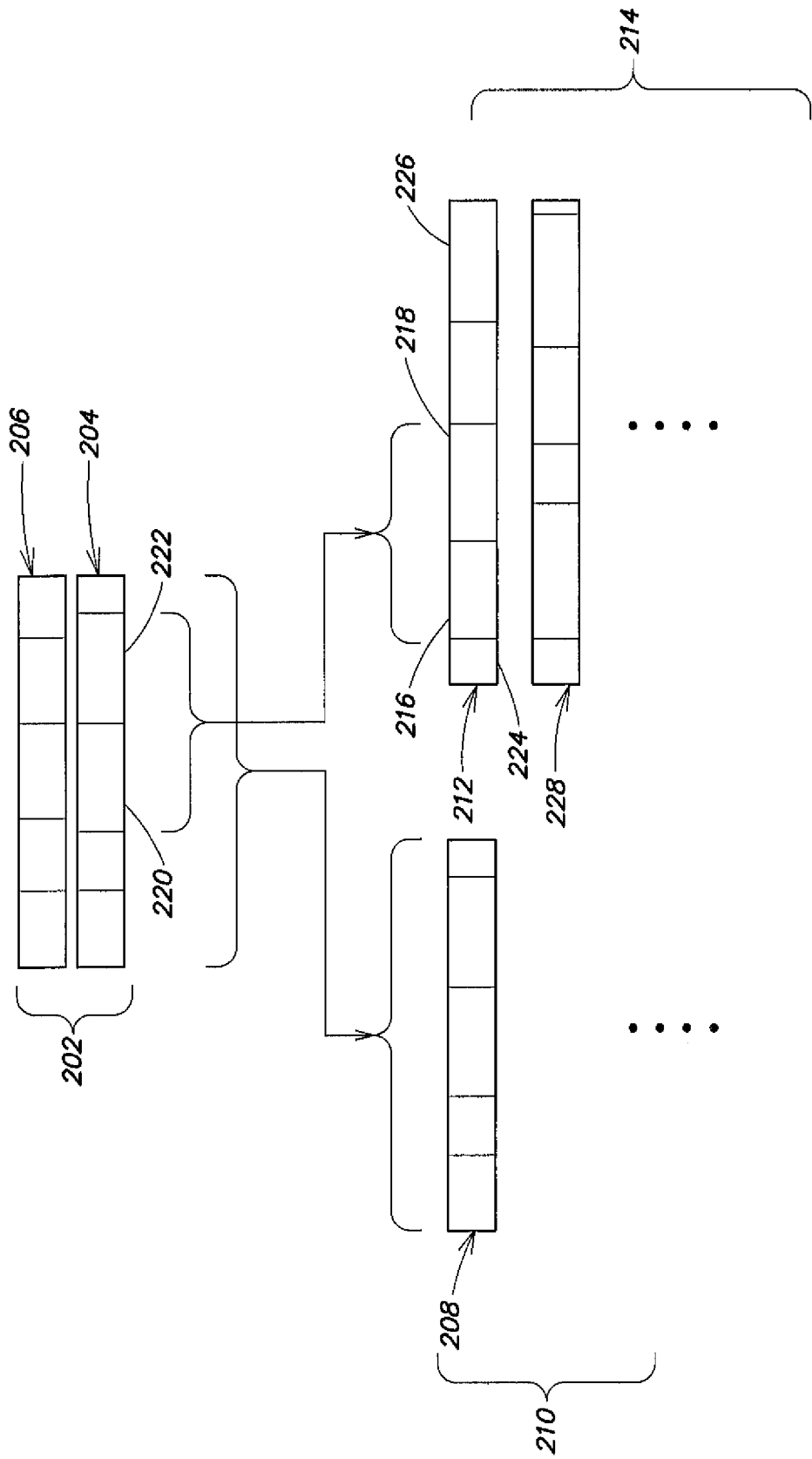
FIG. 2 is a diagram illustrating one-to-many inheritance relationships.
Figure 3:
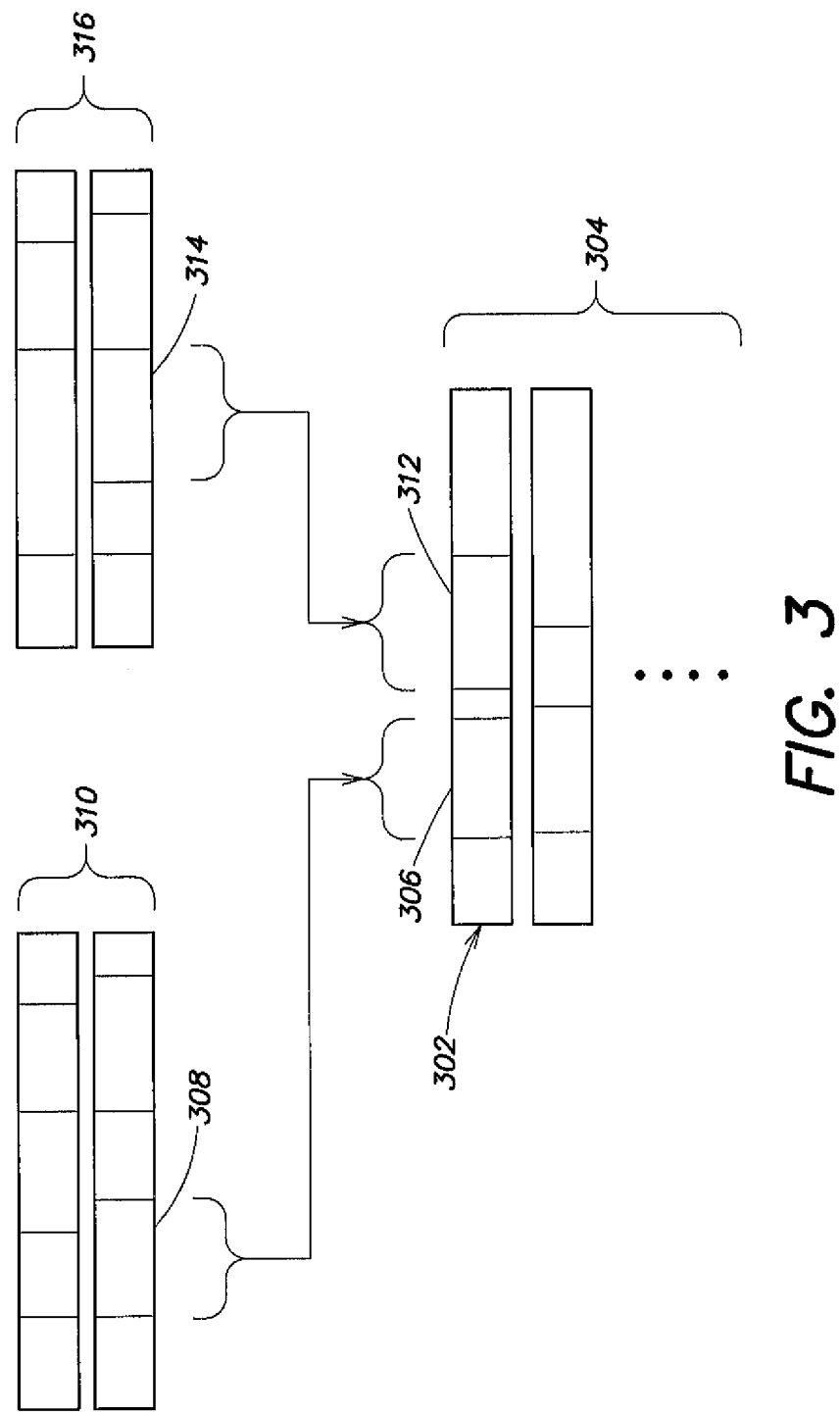
FIG. 3 is a diagram illustrating many-to-one inheritance relationships.

As indicated in FIG. 2, more than one derivative program may inherit tracks or elements from a single parent (one-to-many inheritance). In addition, a derivative program may inherit content from more than one parent (many-to-one inheritance), as illustrated in FIG. 3. Track 302 of derivative 304 inherits element 306, corresponding to element 308 of parent program 310, and also inherits element 312, corresponding to element 314 of parent program 316. We describe a use scenario for one-to-many and many-to-one inheritance models below.

The inheritance of elements described above involves placing a clone of the parent elements into a derivative. In some inheritance relationships, elements are not cloned, but are converted en route to the derivative. For example, a parent master program may include a 2K RUB video track, which is converted into a 1080p/24 10-bit YUV video track in a HD derivative program, and into a 480i/30 10-bit YUV video track in a SD derivative program. The conversion process is specified as part of the definition of the inheritance relationship between the parent and the child. In the described embodiment, the source of the inherited element and the conversion process, if any, is part of the specification of the inheriting track in the derivative.

In addition to time-based media tracks and portions thereof, derivative programs may inherit still imagery, graphics, and attributes that include a wide range of metadata and actions that pertain to, and are associated with, elements of a composition. The attributes may be associated with the composition as a whole (e.g., title, creator, actors), to one or more tracks (e.g., Spanish language, woman's voice, length, stereo), or just to one or more of the elements (clips) of a track (e.g., 3D video, animation, text titles). Certain attributes may include time-based metadata (e.g., triggers for interactive content, scripts, textual descriptions), with a corresponding representation on a track in a timeline. Such time-based metadata may itself have non-time-based metadata associated with it. For example, the author of script is a non-time-based attribute of the time-based text metadata.

The functional types of attributes may include but are not limited to structural metadata that describe technical aspects of the media essence (e.g., MPEG4, two audio channels, HD raster), descriptive metadata and that provides information about the program (e.g., author, language, length, title, scene description), metadata that controls a downstream process (e.g., trigger, ad insertion, format converter), metadata that describes all aspects of program authoring (e.g., clip names, sequence, time in, time out, transitions, clip effects), permission-related metadata (e.g., territory restrictions, restrictions on who can view), and program text (e.g., closed captions, titles).

Various categories, subcategories, and corresponding examples of items that may be inherited by a derivative program include, but are not limited to, the list shown in Table 1.

One or more of the listed items may serve to distinguish a derivative from other members of the related program tree. In other words, a selection of one attribute from a set of alternatives may result in a branch in the hierarchical program family tree. The leaf nodes of a tree, which correspond to the set of deliverable programs, are each defined by the selection of a unique set of tracks, elements, and attributes. In making selections for an end-point deliverable program, some categories or subcategories include mutually exclusive choices, in which only a single choice can be made. For example, referring to Table 1, the image subcategory includes mutually exclusive choices since each deliverable can only include a single choice of color space, frame rate, and raster. For other categories or subcategories, multiple choices may be selected for inclusion in the deliverable. In the subtitles subcategory, for example, subtitles of several different languages may be included in a movie DVD, enable the viewer to select one for playback. In general, many combinations of the listed items will not represent deliverable programs.

TABLE 1

| CATEGORY | EXEMPLARY SUBCATEGORIES | DESCRIPTION and EXAMPLES |
| --- | --- | --- |
| Timing | Marks | DVD chapter marks |
| | Annotations | Time-based annotations from stakeholders (review & approval); |
| | Relative Temporal Position of Elements | Time code values (start, stop) of clip elements in a timeline or composition |
| | Revisions | Cut-down sequences for different forms of distribution, broadcast, webcast, download (e.g. "director's cut") |
| | Placeholders | "Slugs" for future placement of advertising or interstitial material such as advertising "tags" |
| | Time-based Effects and Parameters | Inherit a "fade from black" effect at the beginning of every version |
| Content | Selected Audio and Video Sources | For airline version, do not inherit airplane accident scenes |
| | Censored Material | Alter or replace material that is not appropriate for a specific audience, e.g., political or social censorship; logo of a company appearing on a product may be removed by blurring |
| | Graphics and Branding | Logos identifying a television station or network are overlaid on specific versions |
| | Subtitles | Time-based text overlays for different language translations |
| | Localized Versions | Audio language versioning -- inherit the video composition but replace some audio clips with translated dialog recordings |
| Metadata | Source | Film, tape or file source information that describes the genealogy of inherited content |
| | Ancillary Data | Closed captioning information; aspect ratio; active format descriptor (AFD); logo insertion triggers |
| | Digital Rights | Regional distribution rights based on an expiration date for permission to use |
| | Text | Textual metadata for populating a template for "lower third" titles |
| | Region of Interest | Defined by cropping, scaling, pan & scan, pan & tilt |
| | Spatial | Tracking metadata |
| | Audio | Reference level, such as −20 dB LKFS; dialog normalization; audio mix configuration, e.g., 5.1, Lt/Rt, track ordering |
| | Image | Color space, e.g., RGB, YCrBr; frame Rate, e.g., 30 fps, 24 fps; raster, e.g., 1080i, 480p |
| | Dimensions | 2D/3D (stereoscopic) |
| | Encoding Parameters | Bit Rate; Codec; CBR/VBR; File Format |
| | Interactive | Triggers for interactive content insertion on set top box |

TABLE 1-continued

| CATEGORY | EXEMPLARY SUBCATEGORIES | DESCRIPTION and EXAMPLES |
|---|---|---|
| | Clip-associated Effects | Color correction, speed (e.g., slow motion), key frames |
| | Descriptive | "Slate" information describing the program version; iSAN number |
| | Distribution | iTunes delivery metadata |

An inheritance relationship may specify rules for implementing conformance. In some circumstances, such as when working with high resolution video, complex effects, and longer duration clips or tracks, conformance and rendering may be a time-consuming process. Inheritance rules may specify that the system use available resources to precompute a rendering of the current state of a derivative so that the derivative is available for viewing when requested. There is no need to precompute effects that can be rendered in real time.

A key aspect of inheritance relationships is their persistence throughout the media composition workflow. In a typical scenario, an editor creates a master program and a derivative program, and defines an inheritance relationship between the derivative and the master. The inherited content may be propagated from the parent to the derivative at the time the inheritance relationship is defined, but this may only be the first of multiple invocations of the inheritance relationship during the production cycle of the master and its progeny. In general, the authoring process continues over a period of time, during which changes continue to be made to the master program. As long as alterations continue to include changes to elements that are inherited, the updated, post-alteration elements are propagated at the desired time to the derivative in accordance with applicable inheritance relationships.

The inheritance relationship includes a specification as to when an alteration to the master program is to be propagated to the inheriting derivative. In various embodiments, the alteration is propagated automatically when an alteration to the master program is made, or when a stakeholder indicates that a creative phase is completed, or at any stage of the authoring process upon receipt of a propagate command from a user. In some embodiments, propagation is triggered when a predefined condition is met. Such conditions include, completion of the rendering of a special effect on a selected clip or duration, effectuation of a specific edit to a master element, or the lapse of a time interval (i.e., propagation occurs at regular, predetermined time intervals).

Both push and pull styles of inheritance are supported. In push-style, upon a condition being met in the master program, updated content is pushed out to multiple derivatives automatically. Push-style inheritance is especially useful in one-to-many inheritance hierarchies, in which a single master (or derivative acting as a parent) acts as a parent for more than one derivative (See, e.g., FIG. 2). When more than two levels of inheritance are defined in a compositional hierarchy, the updated content may be propagated, or rippled, through to more than one level of the hierarchy, and ultimately to a deliverable program. Viewing the compositional hierarchy as a tree, changes in the root may be automatically propagated down the tree in accordance with the defined inheritance relationships.

In pull-style inheritance, a derivative pulls its inherited content from one or more parent programs upon a condition being met in the derivative. Pull-style inheritance is useful in many-to-one inheritance (FIG. 3), in which a single derivative inherits content from multiple master programs. For example, in a scenario in which a derivative includes content from many parents, it is desirable to download updated content from several masters that may exist in various stages of completion when preparing a new version of the derivative.

Inheritance relationships may also specify tracks, locations within a track, and other details that specify a location in a derivative where inherited elements are to be placed. For inheritance of entire tracks, the location includes specifying the track name in the child program. For inheritance of a clip, the location includes a specification of a temporal location in the receiving track, such as an offset time, a time-code, or other temporal specification.

Figure 4:
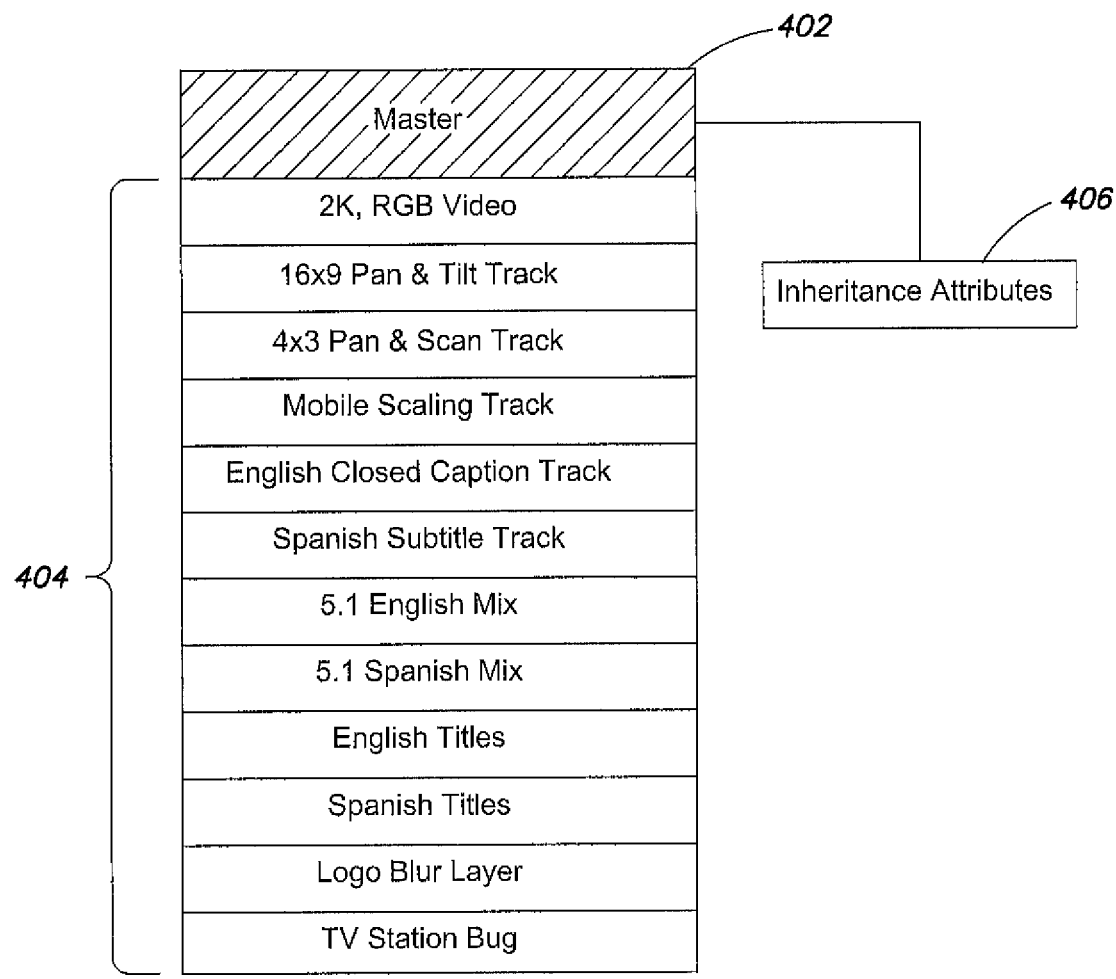
FIG. 4 is high-level illustration of a master program data structure.

In the described embodiment, the underlying data model that represents a hierarchical authoring tree includes a master program framework that contains all the data that is needed for the entire family of related programs. Thus, the master serves as an aggregation point for all the elements from all derivatives, constituting the inventory of material that is to be used in any of the family's programs. FIG. 4 is a high level illustration of a data structure representing a master program. Master program 402 includes timeline tracks and attributes 404 that include the essence, metadata, and other information that is needed to generate a family of related programs. In addition, master program 402 includes inheritance attributes 406, that specify, for each derivative program and endpoint deliverable program, what is to be inherited by the program, where it is to be located in the program, when and how any content a program inherits from the master is to be propagated to it, as well as video or audio conversion processes that take place when content is propagated to the program. The specification of what is to be inherited includes both time-based media, such as video and audio tracks, partial tracks (clips), as well as streams of time-synchronous metadata and non-time-based attributes.

Inheritance attributes 406 are represented by metadata that is generated during the authoring process for a family of related programs. This data is not created explicitly by the user, but rather is compiled into a data structure during the process of constructing the family of related programs, in which the user interacts with an interface that facilitates such hierarchical composition. Thus, although the internal data structure of the system aggregates all content into the master, the user interface represents derivatives as separate nodes on the tree, each having their own content, both inherited and non-inherited. Accordingly, the user constructs a derivative program by incorporating elements that are to be inherited from a program higher up the program family tree, and by defining elements that are "new" to the derivative. For example, when creating a Spanish language derivative, the video tracks may be inherited, but a new Spanish audio, title, and subtitle track may be added at the level of the Spanish derivative.

Figure 5:
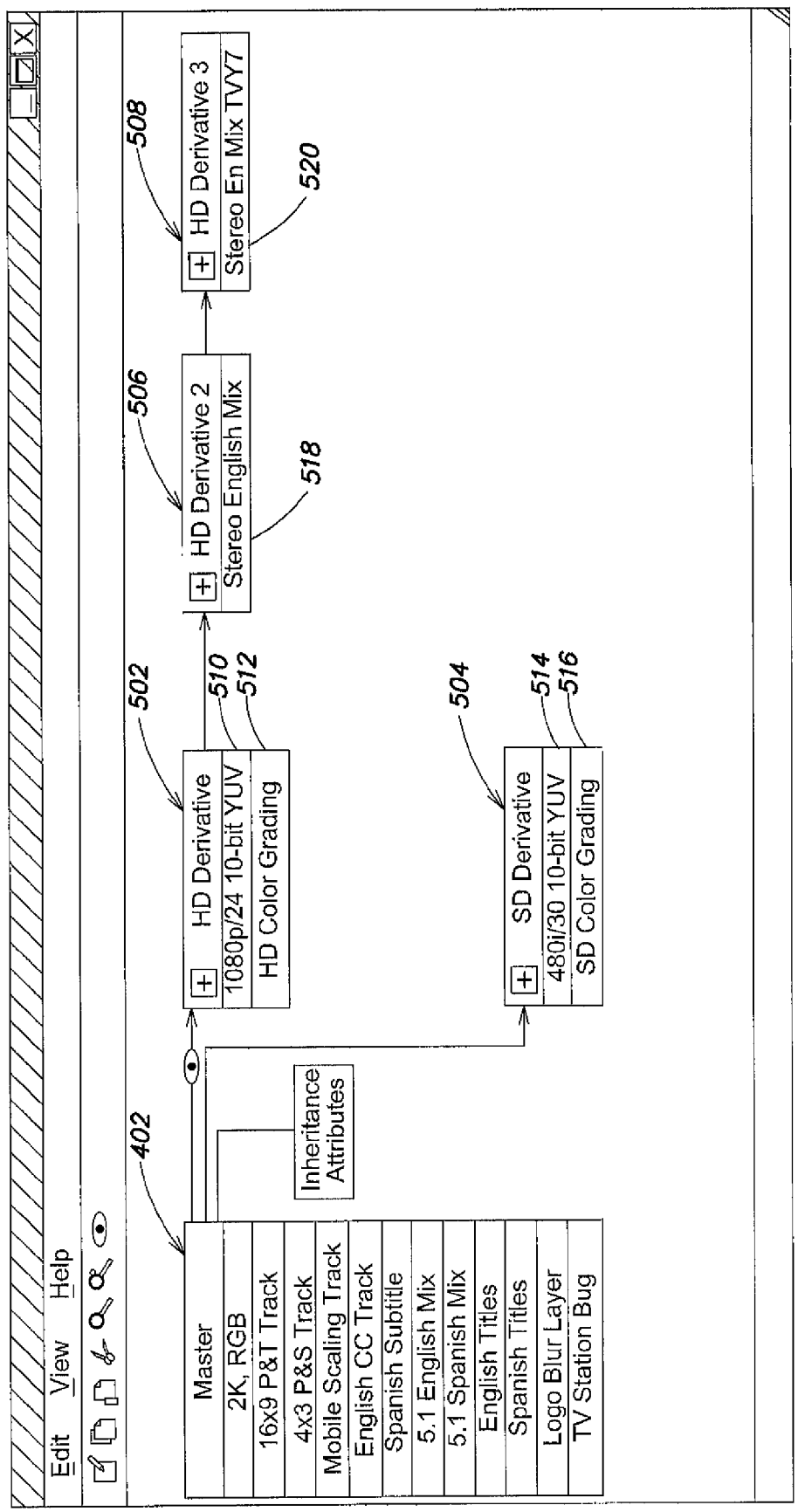
FIG. 5 is a user interface view of a hierarchical tree of programs.

The system provides a user interface to facilitate the viewing, creation, and editing of a family of related programs. The interface represents the master and its family of related programs as a hierarchical tree, as illustrated in FIG. 1, in which the master program is shown as the root node, with derivatives as nodes at intermediate levels of the tree, and end-point deliverable programs at the leaf nodes. Inheritance relationships are represented by inheritance connectors. This UI view is generated from the underlying data model, which, as described above, may place all the family's data into a single master data structure, describing all elements used in the family of programs, as well as the compositional instruction sets for assembling all the programs in the family and the inheritance relationships between all programs in the family. In the synoptic mode, the user interface shows hierarchical relationships, without span information, an example of which is illustrated in FIG. 5. Referring to the Figure, master program 402 is related to three derivative programs, HD Derivative (502) and SD Derivative (504), which are directly descended from the master, and HD Derivative 2 (506) and HD Derivative 3 (508), which are in turn derived from HD Derivative (502) and HD Derivative 2 (506) respectively. In this view, only one or more elements that characterize each derivative are displayed. In many cases, the characteristic elements that are displayed in this high level synoptic view of the derivatives are elements that are not inherited, or if inherited, undergo conversion. For example, referring again to FIG. 5, HD Derivative (502) includes a 1080p/24 10-bit YUV video track (510) that has been generated by conversion from the 2K, RGB track in the master. In addition, HD color grading metadata has been added, and the color grading metadata is indicated in the HD derivative as a separate track element (512) in the synoptic view. Similarly, for the SD Derivative, converted 480i/30 10-bit YUV track (514) and SD Color Grading (516) are indicated. In HD Derivative 2 (506), Stereo English Mix 518 is featured, and in HD Derivative 3 (508), Stereo English Mix TV-Y7 (520) is added.

Figure 6:
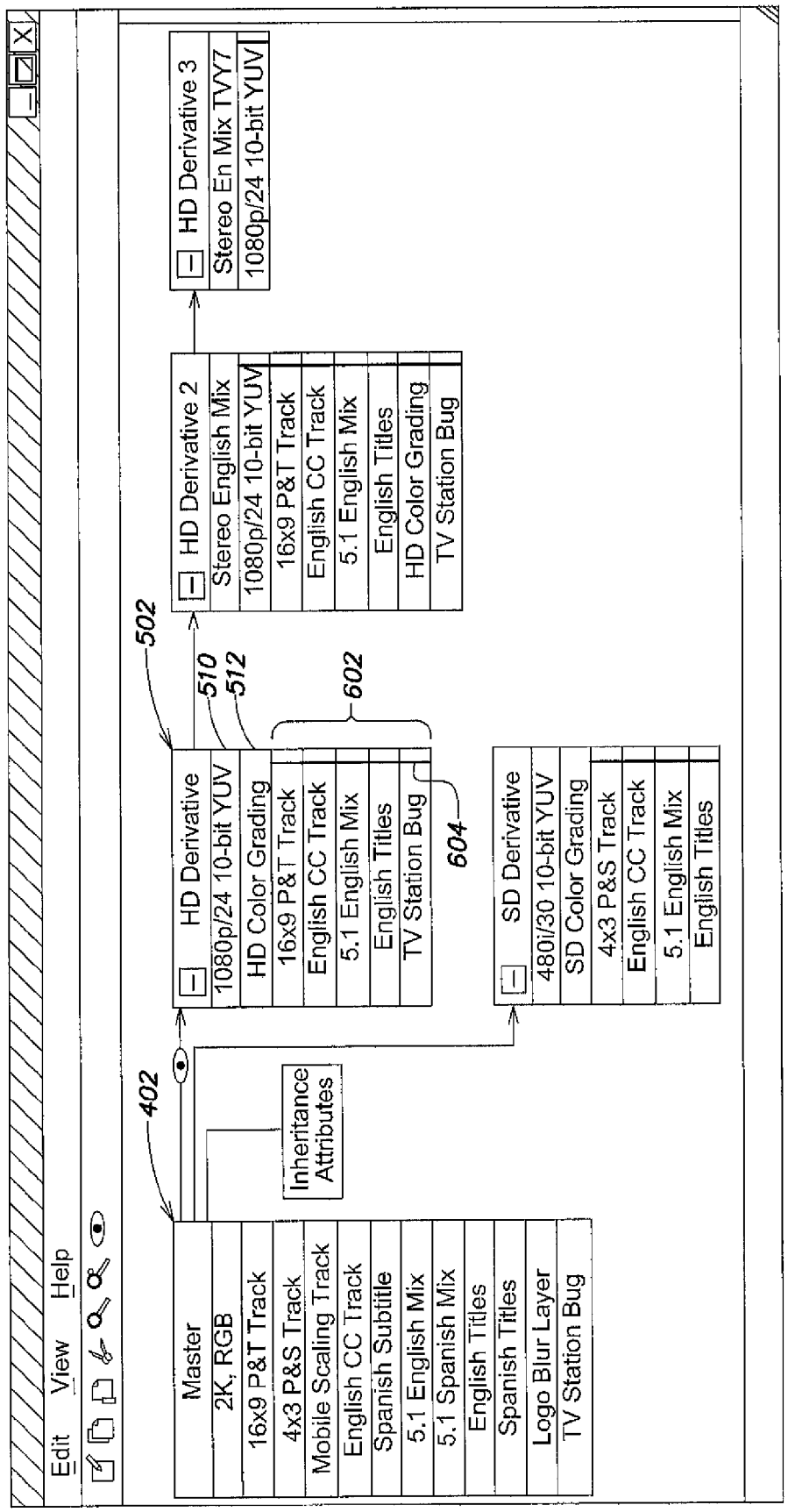
FIG. 6 is a user interface view of the tree illustrated in FIG. 5, in which derivative programs are expanded to show their inherited elements.

The interface enables the user to select a more detailed view of the derivative programs, in which inherited as well as non-inherited content is shown. Thus, for example, as illustrated in FIG. 6, with each derivative node open, the UI shows that HD Derivative 502 includes non-inherited material, i.e., 1080p/24 10-bit YUV track 510 and HD Color Grading metadata 512, as well as inherited elements 602, that include the 16×9 pan and tilt track, the English closed caption track, the 5.1 English mix, the English title, and a TV station bug. The distinction between inherited and non-inherited elements may be highlighted, such as, for example, by using graphical element 604 to mark elements that are inherited.

Figure 7:
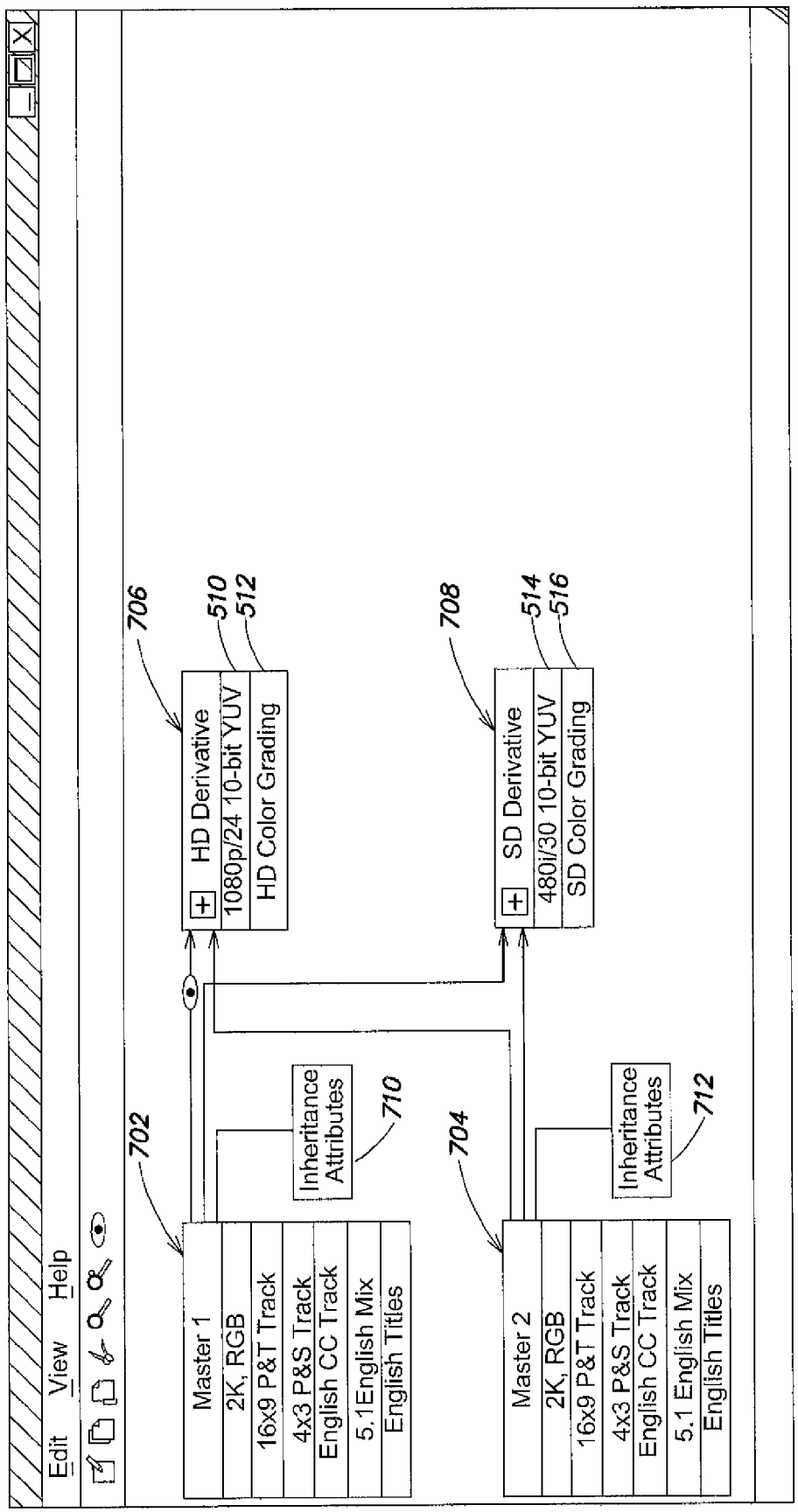
FIG. 7 is a user interface view of derivative programs with elements inherited from two master programs.

Inheritance from multiple masters, as first discussed above in connection with FIG. 3, is handled with the same user interface, as illustrated in FIG. 7. Two masters, 702 and 704, include content that is inherited by each of HD derivative 706 and SD derivative 708. Inheritance attributes 710 and 712 for each of the masters specify what is to be inherited by each of the derivatives in the family from each of the masters.

Figure 8:
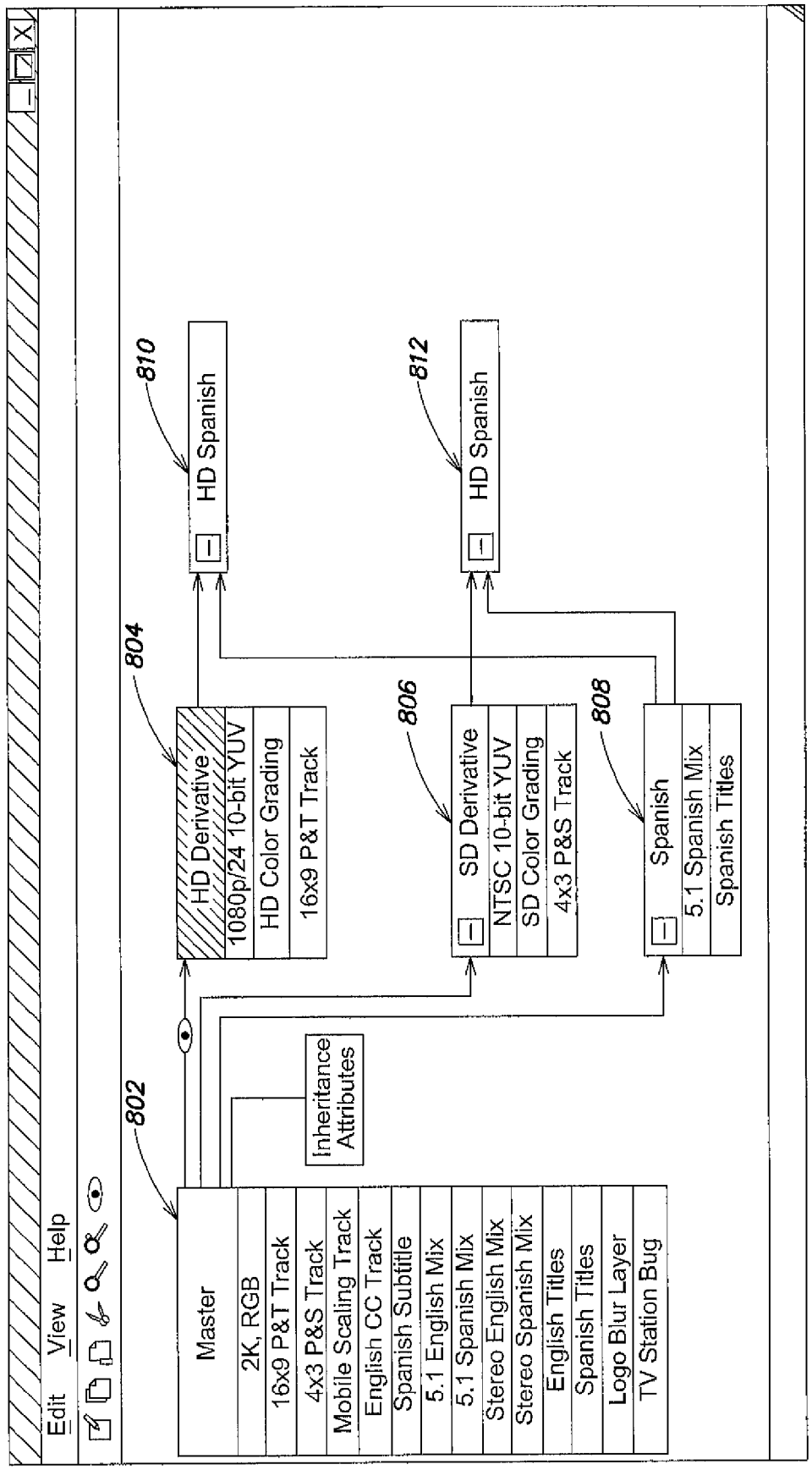
FIG. 8 is a user interface view of hybrid inheritance.

In addition to inheritance from multiple masters, a derivative may inherit elements from more than one parent derivative. Use of such hybrid inheritance relationships may reduce the number of derivatives required at intermediate levels, and is especially valuable when large numbers of end-point deliverable programs are required from a master. However, hybrid inheritance is only an effective technique when the elements inherited from each of the parent derivatives are orthogonal to those inherited from each of the other in the sense that changes within the set of inherited elements from one parent derivative do not conflict with changes with any of the elements inherited from another parent derivative. FIG. 8 illustrates the use of hybrid inheritance that exploits the orthogonality between video format and language elements. Master program 802 includes both English and Spanish audio mixes and titles, as well as the 2K RGB video track, and other elements. HD Derivative 804 is generated by converting the 2K RGB track into 1080p/24 10-bit YUV, adding HD color grading, inheriting the 16×9 pan and tilt track, as well as other elements as desired. Similarly, SD Derivative 806 is generated by converting the master video to NTSC 10-bit YUV, adding SD color grading, inheriting the 4×3 pan and scan track, and other elements. A separate Spanish intermediate 808 is generated that includes just selected Spanish elements, such as the 5.1 Spanish audio mix and the Spanish titles. Two Spanish language deliverables, HD Spanish 810 and SD Spanish 812 are then generated using hybrid inheritance, in which the non-language-specific elements are inherited from HD Derivative 804 and SD Derivative 806 respectively, and the Spanish elements are inherited from Spanish intermediate 808.

During the media authoring process, an editor may choose to detach a derivative from a program tree of which it forms a part, thus eliminating previously established inheritance relationships. When such a derivative is broken away from the program tree, its content, either previously inherited, or added specifically for that derivative, is retained, and it can then serve as a master for a new program tree, or become a program deliverable.

As a safety measure, the hierarchical composition system may also permit a user to "freeze" a selected derivative from receiving accidental changes, either via inheritance or via direct alteration in the selected derivative itself. Such a frozen derivative may only be altered after a user explicitly chooses to override the freeze setting.

Figure 9:
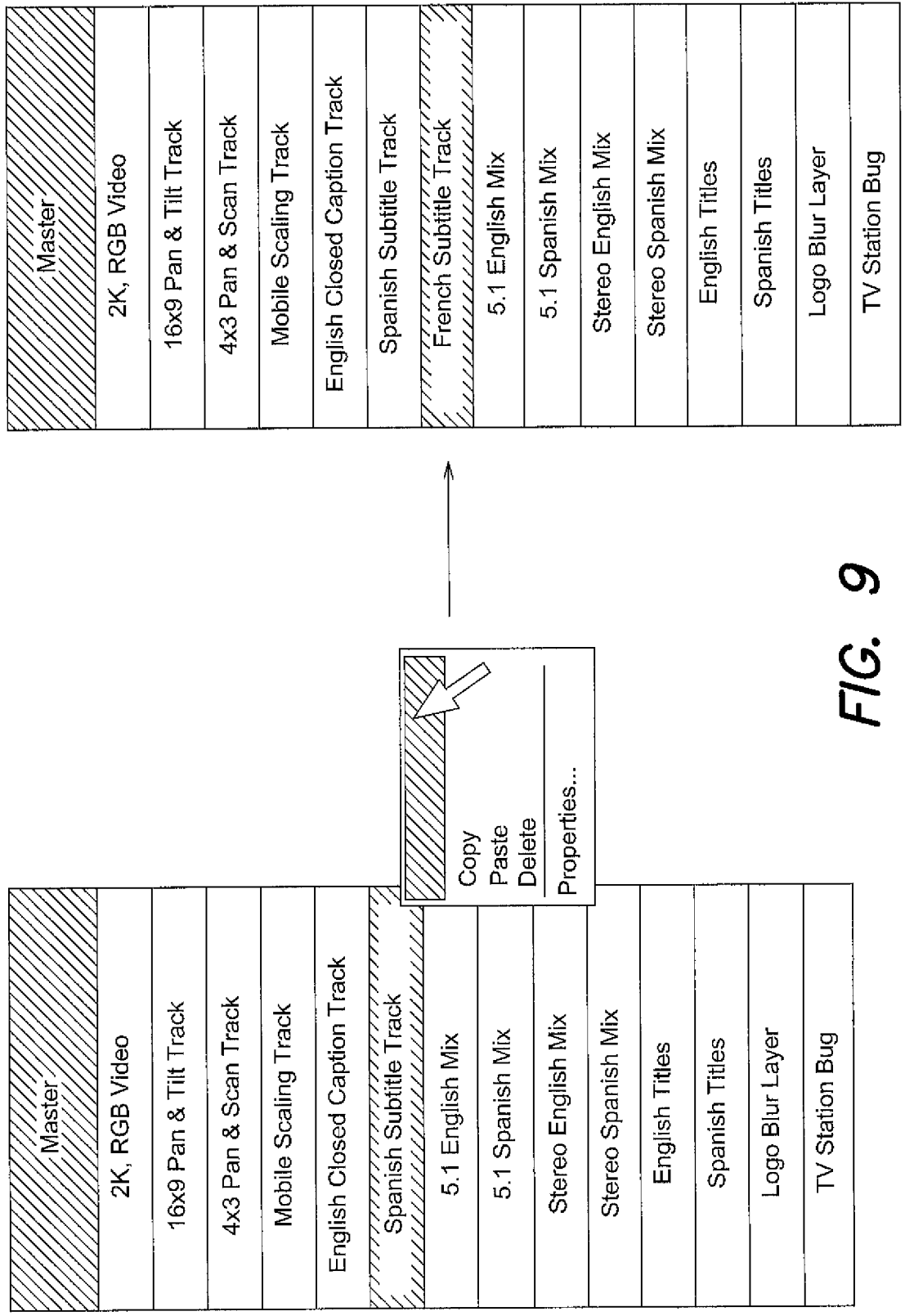
FIG. 9 illustrates a user interface for creating the structure of a master program.

A user interface is provided for facilitating the creation of families of related programs. The elements to be inherited are specified by one or more of the following methods: selecting tracks to be inherited from a list; selecting all the elements from a track except those in a list, those that are marked, those that fall within a time range, or elements of specified types; and selecting only the elements in a list, that are marked, fall within a time range, or belong to specified types. In various embodiments, the user drags elements to be inherited from the master to the derivative timeline. FIG. 9 illustrates a GUI for adding a new track to a master. The user adds a new attribute (French subtitle track) below the selected location (Spanish subtitle track) in the master by "right-clicking" within the body of the master to bring up a pop-up menu, selecting "New Attribute," with the result shown at the right of FIG. 9.

Figure 10:
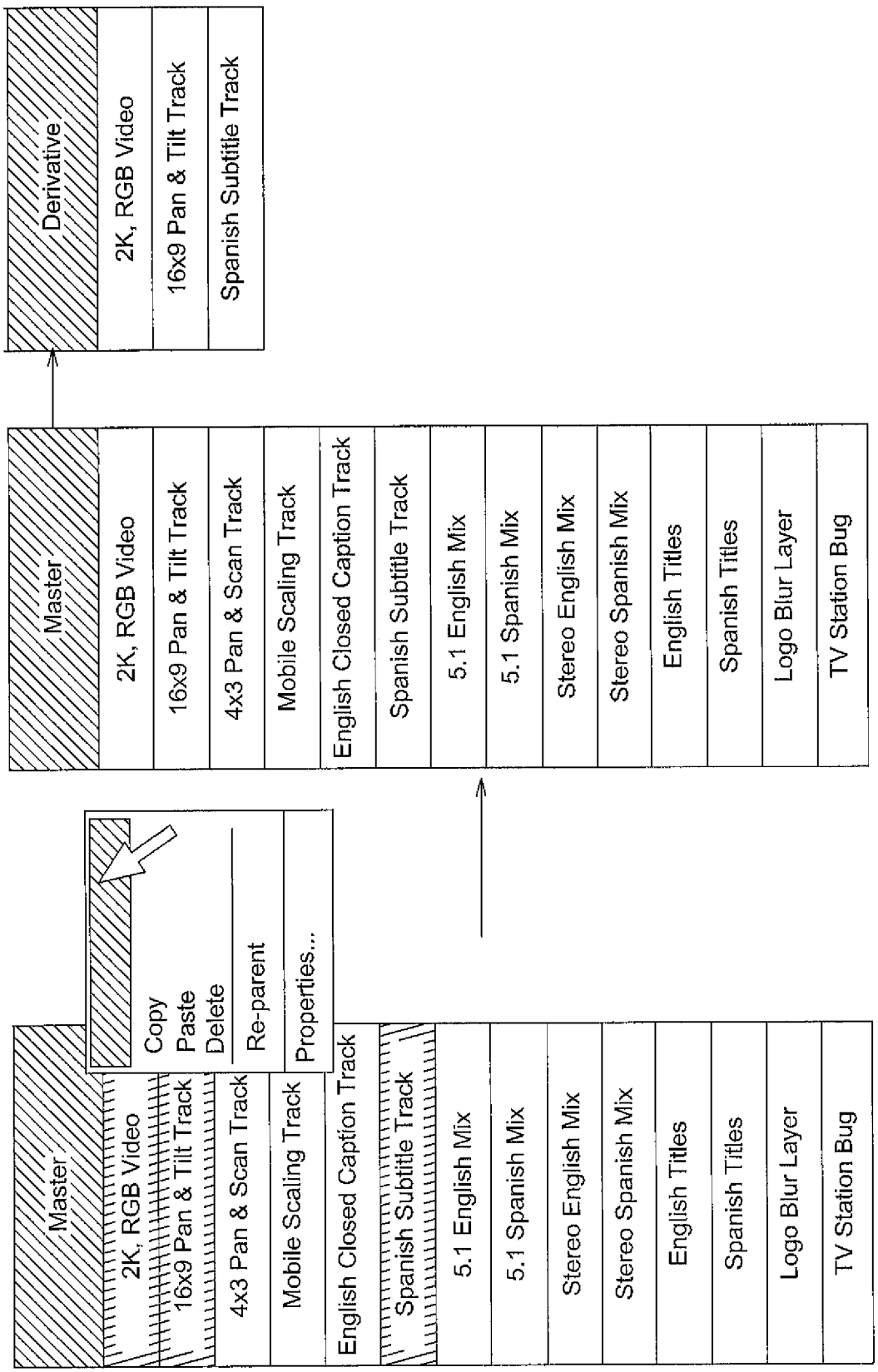
FIG. 10 illustrates a user interface for creating a new derivative.

FIG. 10 is an illustration of a GUI to create a new derivative, in which the user selects the attributes of the parent that are to be inherited by the new derivative, "right-clicks" in the header of the parent program, and selects "New Derivative" in a pop-up menu. In the example shown, the user creates a derivative by selecting the 2K RGB video, pan and tilt, and Spanish subtitle tracks. The resulting new derivative, as well as its inheritance relationship to its parent, is shown at the right of the Figure. The interface also provides means (not shown) for specifying further aspects of the inheritance relationship, including the timing of propagation of inherited material, and the location within the derivative for placement of the inherited material.

The system enables a user to make compositional changes at any level of the hierarchical tree. The scope of a change is defined by the location of the program within the tree, with changes propagating only to derivatives at lower levels of the tree linked by inheritance relationships to the program being edited. However, should a change made at one level be required for sharing with programs elsewhere in the tree, the changed element may be promoted one or more levels, up to and including promotion to the master program. The system attempts to alert the user to elements in which such promotion might cause conflicts. Situations that are likely to give rise to conflicts are described below.

In order to effect changes to a particular program in the family tree, the user may select it, such as by double-clicking in the program header, opening a timeline view and monitor window, while still retaining a view of the family tree to maintain the overall context within the family hierarchy. The timeline shows a time-based view of the video, audio, as well as metadata, effects, and other attributes. Inherited tracks or partial tracks (e.g., clips), are visually distinguished from non-inherited material, such as by highlighting them with a distinctive color.

In addition to the family tree view and the timeline, the system includes a monitoring window that may enable a user to play back a derivative at any level of the hierarchy. Such a capability facilitate monitoring of derivates to verify that the specified inheritance properties are what was intended and have been correctly implemented. This feature is also valuable for general quality assurance purposes. In the described embodiment, the system may pre-render a derivative, storing the rendered program in a buffer so that, when requested by the user, playback can proceed without delay.

Figure 11:
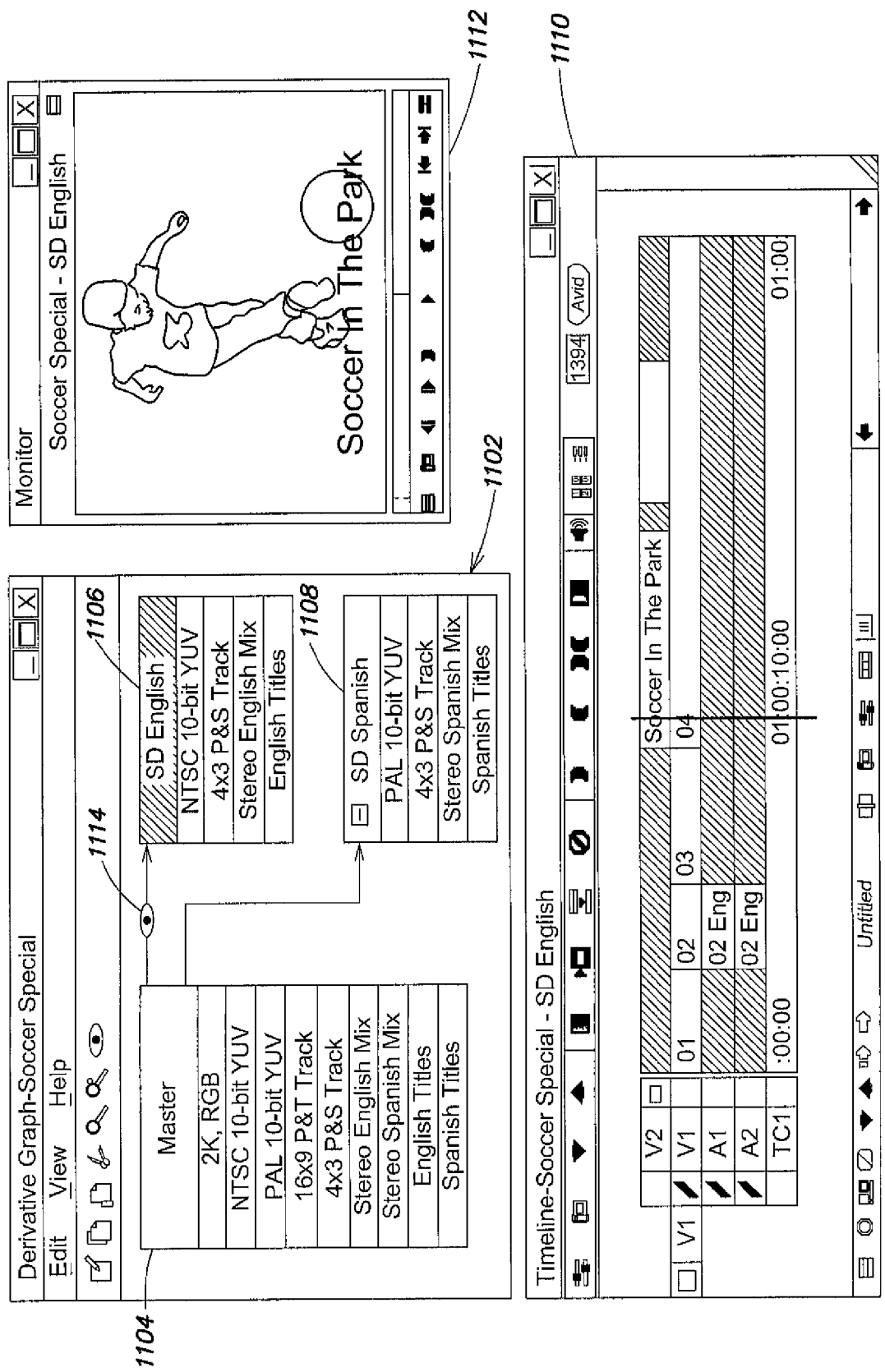
FIG. 11 illustrates a user interface for editing and monitoring a derivative program within a hierarchical tree of programs.
Figure 12:
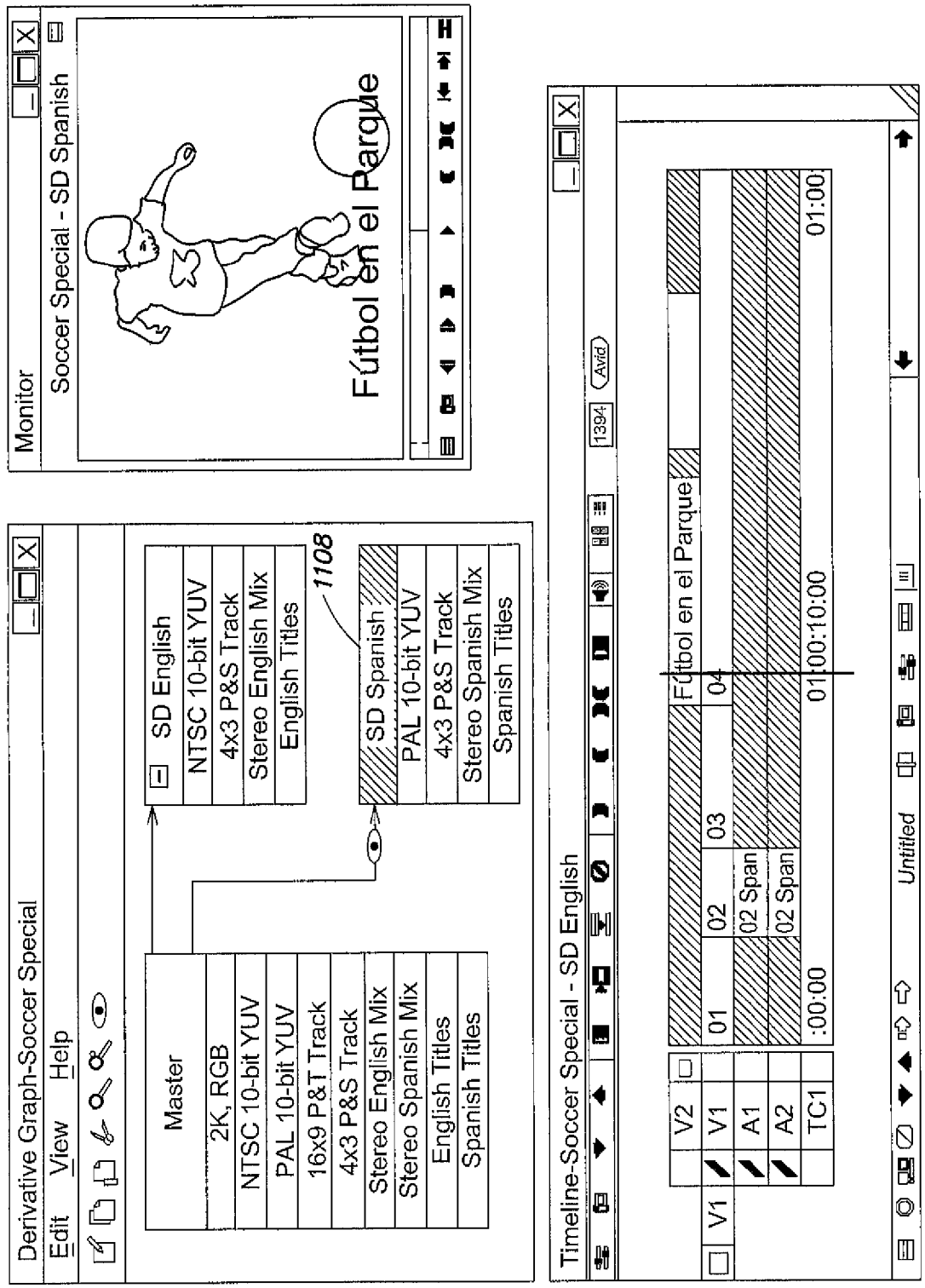
FIG. 12 illustrates a user interface for editing and monitoring a second derivative program in the hierarchical program tree shown in FIG. 11.

A UI for editing a member of a hierarchical program family is shown in diagrammatic form in FIG. 11. A view of the family tree appears in window 1102, with master program 1104 and two of its derivatives, SD English derivative 1106 and SD Spanish derivative 1108. The user selected SD English derivative 1106 for editing, indicated in the illustrated user interface by highlighting the header. The timeline view appears in window 1110, and the viewer, or monitor, appears in window 1112. The user may select another program in the tree for editing and monitoring, causing the timeline and monitor views to switch to the new program, as illustrated in FIG. 12 in which SD Spanish derivative 1108 is selected, as indicated by its highlighted header.

By default, the timeline and monitor views correspond to the program currently selected for editing. In the illustrated example, the GUI reflects this situation by displaying an eyeball icon 1114 indicating what is being monitored. However, the selection of which derivative is to be viewed may be decoupled from the currently selected editing context. This enables the user to determine the scope of the inheritance for the changes being performed without constraining the editor to view the result of those changes at that same level. It is to be expected that the editor will desire to make changes at the highest possible authoring level in a program family, so as to make the updated content available for inheritance across all derivatives that may inherit the changes, while the viewing level may be at a lower level, indeed as low as a leaf node of the tree, corresponding to an end-point deliverable. In terms of the user interface, the program being edited and the program being viewed are separately selectable. This feature requires that changes are propagated and conformed in real time. For example, the user may be editing the pan and scan track in the master and elect to view the result of an edit in the 4:3 SD derivative. In another example, the user may edit the scaling track for mobile devices, with the viewer set to play back a smartphone endpoint deliverable.

Figure 13:
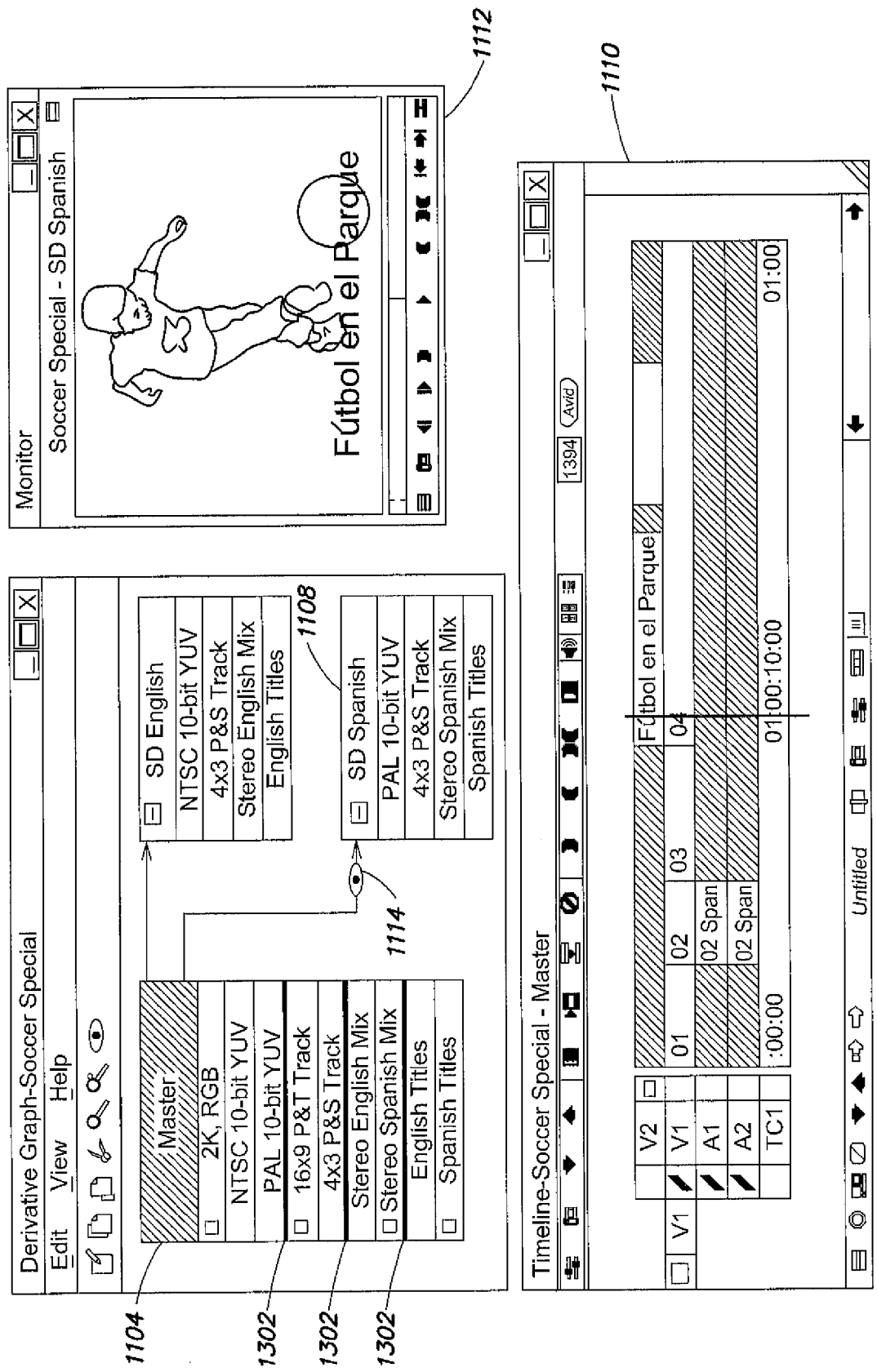
FIG. 13 illustrates a user interface for editing a master program while monitoring a derivative program.

Splitting the program being edited from the program being monitored is illustrated in FIG. 13, in which master program 1104 is being edited, as indicated by its highlighted header, but SD Spanish program 1108 is being monitored in monitor window 1112, as indicated by eyeball icon 1114. In this situation, the system selects a set of elements from the master for playback that will not conflict. In the described embodiment, the user defines the sets of elements in the master that form mutually exclusive sets, from which only one element is to be selected at a time. In the illustrative user interface of FIG. 13, this is indicated by bolded boundaries 1302 between the mutually exclusive element sets in master 1104. Thus, only one video track, one of the pan and scan track and pan and tilt track, one mix, and titles in one language can be monitored at a time. If the selection of one of these elements has not been specifically added at the derivative level, the choice may be undefined. By default, the system selects an arbitrary element from the set; the user may override this selection.

The system also enables multiple derivatives to be monitored simultaneously with synchronized play back. Ganging up of viewers permits users to compare derivatives, enabling differences to be readily identified. Unintentional differences, such as in color corrections, can be picked out readily during synchronized playback, and unwanted differences can be removed. A difference tool automatically highlights differences between selected elements of two derivatives, thereby assisting the user in navigating to regions that may require adjustment.

In order to provide editors with an accurate rendering of an end-point deliverable, monitor windows, such as window 1112, may be designed to simulate the overall appearance as well as the technical characteristics of the corresponding target delivery platform. For example, for a deliverable targeted for a smartphone, a rendering of the phone and its screen is presented in the UI, with the monitored end-point program playing in the simulated screen. Any compression or other artifacts may be included in the simulation.

In the default mode, the hierarchical composition system constrains users to perform editorial changes on content within the master or a derivative in which the content being edited appears at its highest level within the hierarchical compositional family tree. This helps prevent the inadvertent creation and/or editing of multiple versions of the same element. Thus, if an element is present in the master, it is edited only within the master, and changes are then rippled through the tree of derivatives. If a user attempts to alter content in a derivative that was inherited from a parent at a higher level, the system may alert the user, and, if the user still wishes to proceed, it creates a new element that no longer has an inheritance relationship to a parent program. Although this system serves to avoid conflicts between copies of elements that are intended to be identical, conflicts may arise none-the-less between elements that are inherited, those that are not, or those that were initially received by inheritance but subsequently altered in the derivative. The system categorizes the various situations that may arise, and alerts the user to areas of potential conflict.

In considering potential conflicts, we assume a workflow that is typical of many production environments. A master is created, and before production of the master is complete, derivative programs are spawned. Derivatives may be shared with various members of a production team, including technical specialists for video and audio, or personnel responsible for broadcast or mobile delivery platforms, or for foreign versions. Review and editing of various elements of derivatives may take place, and new elements may be added. Subsequently, further changes may be made to the master, and the changes are propagated to the various inheriting derivatives in the family. The potential for conflict can arise between such upstream changes, and other elements of the derivative that have been edited or added.

In the simplest situation, a derivative inherits all its tracks and attributes from the master program (or from another derivative) with no tracks or attributes added or edited. In this case, no conflicts can arise in the derivative, since the inherited content is a self-consistent set of elements, and no changes are performed in the derivative. The derivative simply represents a subset of the parent; any track, clip, or attribute changes made upstream will be inherited without conflicts in the derivative whenever updates are propagated down.

Next we consider the case when a derivative initially inherits all its content from a parent, as with the first case considered above, but after the inherited content is propagated and received, one or more inherited elements is altered in the derivative. Subsequently, in accordance with the typical workflow outlined above, a change is made to the master, which is then propagated to the derivative. A potential for conflict between the newly inherited essence and the previously altered element(s) in the derivative arises now, and is particularly likely if the subsequent change in the master involves changing the length of an essence track. In this case, a conflict is likely to arise between the newly inherited essence and elements that were altered to conform to the prior version. For example, if a foreign language audio mix was edited in the derivative, it is likely that it will not be in synch with the newly inherited video. Even if the master re-edit does not change the length of the essence, a conflict may arise. For example, if the re-edit in the master replaced one clip with another clip of the same length, and the edited element in the derivative is a lower screen graphic, the lower screen graphic may no longer pertain to the newly inserted clip. In both cases, the system flags the tracks, spans, and the implicated elements that may give rise to conflicts, so that the user can take corrective action if needed.

A similar risk of conflicts arises when new tracks that are not inherited are added to a derivative. Again, the risk of conflicts arising is high when subsequent re-edits in the master alter the overall essence length, but conflicts may also arise when overall length is unchanged.

When master programs grow in size to include a large number of tracks and attributes, related tracks and attributes are grouped and can be collapsed or expanded to facilitate viewing and selecting what is to be inherited. For example, audio mixes may include three musical tracks and two dialog tracks for any given language. The 5.1 English mix, which comprises 5 separate tracks, may be collapsed down and manipulated as a single track group. Another group, such as, for example, the 5.1 Spanish mix, partially overlaps the 5.1 English mix, since it includes the same three musical tracks, but also includes the Spanish dialog tracks in place of the English dialog tracks.

Placement of inherited material within the derivative is specified by a list of target derivatives, and a location within each derivative. The location is specified by one or more of a track identifier, a position list, a marked position within a derivative timeline, a time range, or an offset. In addition, the system enables the user to specify whether the inherited content is to be inserted at the specified location, or is to overwrite content that is already present.

As indicated, for example, in FIGS. 1 and 5, the presence of an inheritance relationship is shown by an inheritance connector that connects a parent program (which may be a master program or a derivative) with a child program. In the described embodiment, the user may select a connector to cause details of the inheritance relationship it represents to be displayed. Such details include the elements being inherited, the location where the inherited material is being placed in the derivative, and propagation timing settings. In various embodiments, in addition to showing inheritance relationships within inheritance attribute data structure 406, time-based inheritance relationships are displayed on a separate inheritance track in the master and the derivative timelines (not shown).

Commonly used program family trees may be stored as templates that are used as a framework when a new family of related programs is created. For example, when creating a commercial spot for television, it is common to create a 60 second, 30 second, and a 20 second version for use as components in an advertising campaign. When creating a new television commercial family, an editor may create the 60 second master program, then select the appropriate template to create a tree framework including 30 and 20 second derivatives having inheritance relationships for the non time-based attributes already established. The editor then cuts to time to create the 30 and 20 second versions, with many of the inheritance relationships already in place. A more complex template may be associated with a major theatrical release, in which derivative programs for different audiences, platforms, 2D or 3D, and other variations may be included. Templates include the inheritance relationships between a related family of programs even in the absence of their essence. For complex families, setting up a template can represent a considerable amount effort. Templates can be stored and shared, both locally and remotely.

Some examples of ways in which the described hierarchical authoring system may be used are described next.

Example 1

Simple Hierarchical Inheritance

A user wishes to produce a family of related deliverable programs for television and mobile device platforms, in both English and Spanish, with deliverables suitable for all audiences and also deliverables that are suitable only for viewers aged seven years and up. Referring again to FIGS. 4-6, the user creates master program 402 having the following elements: a video track in 2K RGB format, with pan and tilt (aspect ratio 16:9) and pan and scan (aspect ratio 4:3) region of interest tracks; a scaling track for mobile devices; an English closed caption track; a Spanish subtitle track; audio mixes that include 5.1 English mix, 5.1 Spanish mix, stereo English mix, and stereo Spanish mix; English titles; Spanish titles; logo blur layer, and TV station bug. The user then creates HD Derivative 502, a second level derivative, which acts as the parent for the HD English language deliverable programs, which includes two new elements: the 1080p/24 10-bit YUV video track, which is obtained by converting the master 2K, RGB track, and the HD color grading track for color correction. The user also selects the following elements to be inherited from master 402: the 16×9 pan and tilt track (since the HD deliverables will be played in a 16×9 aspect ratio); the overlays and audio corresponding to English language deliverables, i.e., the English closed caption track, the 5.1 English mix, and English titles; and the TV Station bug. The logo blur layer is not selected, since rights to include the logo have been granted for all English language deliverable programs, and it is not necessary to blur out the identity of the logo that appears in the programs. Next, the user creates second level HD derivative 506 by adding stereo English mix track 518, and inheriting all the other elements of HD derivative 502. The user then creates HD Derivative 3 (508), which is one of the end-point deliverables of this family of programs. The only newly added element is stereo English mix TV-Y7, an edited version of stereo English mix 518 in which only material suitable for viewers aged seven and older is included. The HD video track has been conformed with the 16×9 pan and tilt track, the English closed caption track, the English titles, and the TV station bug, to produce a single "flattened" video track. By selecting other elements of HD Derivative 2 for conformance and inheritance, the user can create additional end-point deliverable programs (not shown), including general viewership versions, versions with 5.1 stereo audio mix, and versions without the TV bug, such as for DVD distribution. Similarly, the user can create a set of SD deliverables by inheriting and conforming elements of SD Derivative 504. For Spanish language deliverables, the user creates new second level HD and SD derivatives (not shown) in which the Spanish language subtitles, 5.1 mix, and titles are selected for inheritance instead of the corresponding English language elements. To generate the subfamily of programs to run on mobile platforms, the user selects the mobile scaling track in master 402, and conforms that track with the 2K RGB video track, in addition to selecting other elements of the master for inheritance, with or without selective flattening of elements into the video or audio tracks.

The organization of a related family of programs into a hierarchical tree is not a uniquely defined process. In the example described above, the user creates four second-level derivatives according to desired video format and language. In one alternative tree structure, only two first level derivatives are created, HD and SD, and the various language derivatives are created at the next level, as children of the HD and SD versions respectively. The system enables users to create a hierarchical organization that suits their workflow preferences and the specific deliverables that are required.

Example 2

Multi-Master Inheritance

The user wishes to create a short promotional program that includes brief excerpts from each of a series of programs, such as, for example in promotions for a television drama series. In this many-to-one, multi-master inheritance case, multiple master programs are generated, as shown in FIG. 3 (310 and 316) and inheritance relationships are defined between partial tracks or clips 308 and 314 from two master programs and derivative program 304. The inheritance relationship specifies the location in the receiving track, as indicated at 306 and 312. FIG. 7 illustrates this situation, in which Master 1 (702) and Master 2 (704) are two programs that represent two episodes from a series of programs for which promotional programs in HD (HD Derivative 706) and SD (SD Derivative 708) are created.

Various embodiments include systems in which alternative organizations of program content are used to represent a hierarchical family of related media programs. For example, rather than aggregate all the data for an entire program family within a master program framework, some material may be represented within one or more derivative frameworks, and be absent from the master.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a liquid crystal displays (LCD), plasma displays, cathode ray tubes, video projection systems and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. In a computer-based system for multimedia composition, a method comprising:
   creating a master program of time-based media including one or more master elements defining content of the master program;

creating a first derivative program of time-based media including one or more derivative elements defining content of the derivative program;

defining first inheritance relationship between the master program and the derivative program, wherein the first inheritance relationship specifies at least one master element that is to be inherited by the derivative program; and causing the first derivative program to inherit the content of the specified at least one master element from the master program in accordance with the first inheritance relationship;

creating a second derivative program of time-based media including one or more elements defining content of the second derivative program;

defining a second inheritance relationship between the first derivative program and the second derivative program, wherein the second inheritance relationship specifies at least one element of the first derivative program inherited from the master program in accordance with the first inheritance relationship that is to be inherited by the second derivative program;

causing the second derivative program to inherit the content of the specified element from the first derivative program in accordance with the second inheritance relationship; and after creating the first derivative program and the second derivative program:

altering in the master program one or more of the master elements specified by the first inheritance relationship;

propagating the altered one or more master elements from the master program to the first derivative program in accordance with the first inheritance relationship to create a revised version of the first derivative program in which the one or more elements previously inherited from the master program in accordance with the first inheritance relationship are replaced with the altered one or more master elements;

propagating the altered one or more master elements from the first derivative program to the second derivative program to create a revised version of the second derivative program in which the one or more elements previously inherited from the first derivative program in accordance with the second inheritance relationship are replaced with the altered one or more master elements; and alerting a user to potential conflicts in at least one of the first derivative and the second derivative resulting from the propagation of the altered one or more master elements.

2. The method of claim 1, wherein the specified at least one master element includes a track of time-based media.

3. The method of claim 2 wherein the track of time-based media includes a video clip.

4. The method of claim 2, wherein the track of time-based media includes an audio clip.

5. The method of claim 1, wherein the specified at least one master element includes time-based metadata.

6. The method of claim 1, wherein the specified at least one master element includes a graphic element.

7. The method of claim 1, wherein the specified at least one master element includes a portion of a track of time-based media.

8. The method of claim 1, wherein the master program elements include one or more master program tracks, each of the one or more tracks comprising at least one track element, and wherein the specified at least one master element includes metadata pertaining to one of the master program as a whole, a master program track, and a track element.

9. The method of claim 1, wherein the propagating step occurs automatically when the altering step is completed.

10. The method of claim 1, wherein the propagating step is triggered by a command from a user.

11. The method of claim 1, further comprising providing a user interface for a user of the multimedia composition system to view at least one of the first and second derivative programs.

12. The method of claim 1, further comprising providing a user interface that includes, for each element of the first and second derivative programs, an indication as to whether the element was inherited from the master program.

13. The method of claim 1, further comprising providing a user interface for a user of the multimedia composition system to edit the one or more elements of the master program.

14. The method of claim 13, wherein the user interface further enables the user to view a selected derivative program of the master program while editing one of the master program and a second selected derivative of the master program.

15. In a computer-based system for multimedia composition, a method comprising:

creating a first master program of time-based media including one or more master elements defining content of the first master program;

creating a first derivative program of time-based media including one or more derivative elements defining content of the first derivative program;

defining first inheritance relationship between the first master program and the first derivative program, wherein the first inheritance relationship specifies at least one master element that is to be inherited by the first derivative program; and causing the first derivative program to inherit the content of the specified at least one master element from the first master program in accordance with the first inheritance relationship;

creating a second master program of time-based media, wherein the second master program includes one or more elements defining content of the second master program;

defining a second inheritance relationship between the second master program and the first derivative program, wherein the second inheritance relationship specifies at least one element of the second master program that is to be inherited by the first derivative program;

causing the first derivative program to inherit the content of the specified at least one element from the second master program in accordance with the second inheritance relationship;

creating a second derivative program of time-based media including one or more elements defining content of the second derivative program;

defining a third inheritance relationship between the first derivative program and the second derivative program, wherein the third inheritance relationship specifies at least one element of the first derivative program inherited from one of the first master program and the second master program that is to be inherited by the second derivative program;

causing the second derivative program to inherit the content of the specified at least one element of the first derivative program in accordance with the third inheritance relationship; and after creating the first derivative program and the second derivative program:
  altering in at least one of the first and second master programs one or more of the master elements inherited by the first and second derivative programs from at least one of the first and second master programs;
propagating the at least one altered master elements to the first and second derivative programs in accordance with the defined inheritance relationships; and
alerting a user to potential conflicts in at least one of the first derivative and the second derivative resulting from the propagation of the altered one or more master elements.

16. A computer program product comprising:
a non-transitory computer-readable storage medium; and
computer program instructions stored on the computer readable storage medium which, when executed by a computer, instruct the computer to perform a process for multimedia composition comprising:
  creating a master program of time-based media including one or more master elements defining content of the master program;
  creating a first derivative program of time-based media including one or more derivative elements defining content of the first derivative program;
  defining first inheritance relationship between the master program and the first derivative program, wherein the first inheritance relationship specifies at least one element of the master program that is to be inherited by the first derivative program; and
  causing the first derivative program to inherit the content of the specified at least one element from the master program in accordance with the first inheritance relationship;
  creating a second derivative program of time-based media including one or more elements defining content of the second derivative program;
  defining a second inheritance relationship between the first derivative program and the second derivative program, wherein the second inheritance relationship specifies at least one element of the first derivative program inherited from the master program in accordance with the first inheritance relationship that is to be inherited by the second derivative program;
  causing the second derivative program to inherit the content of the specified element from the first derivative program in accordance with the second inheritance relationship; and
  after creating the first derivative program and the second derivative program:
    altering in the master program one or more of the master elements specified by the first inheritance relationship;
    propagating the altered one or more master elements from the master program to the first derivative program in accordance with the first inheritance relationship to create a revised version of the first derivative program in which the one or more elements previously inherited from the master program in accordance with the first inheritance relationship are replaced with the altered one or more master elements;
    propagating the altered one or more master elements from the first derivative program to the second derivative program to create a revised version of the second derivative program in which the one or more elements previously inherited from the first derivative program in accordance with the second inheritance relationship are replaced with the altered one or more master elements; and
    alerting a user to potential conflicts in at least one of the first derivative and the second derivative resulting from the propagation of the altered one or more master elements.

17. A computer system providing a user interface for media composition, the computer system comprising:
  computer-readable storage for storing a representation of a master program of time-based media, the master program including one or more master elements, wherein the representation includes an indication of at least one of the one or more master elements defining content of the master program;
  a display and input mechanism configured to provide a derivative creation tool for enabling a user to define a first and a second derivative program of time-based media, the first and second derivative programs including one or more derivative elements defining content of the first and second derivative programs;
  the display and input mechanism further configured to provide an inheritance tool for:
    defining first inheritance relationship between the master program and the first derivative program, wherein the first inheritance relationship specifies at least one element of the master program that is to be inherited by the first derivative program;
    defining a second inheritance relationship between the first derivative program and the second derivative program, wherein the second inheritance relationship specifies at least one element of the first derivative program inherited from the master program that is to be inherited by the second derivative program;
    altering in the master program one or more of the master elements specified by the first inheritance relationship;
    propagating the altered one or more master elements from the master program to the first derivative program in accordance with the first inheritance relationship and from the first derivative to the second derivative in accordance with the second inheritance relationship;
    alerting a user to potential conflicts in at least one of the first derivative and the second derivative resulting from the propagation of the altered one or more master elements.

* * * * *